Patented Aug. 5, 1952

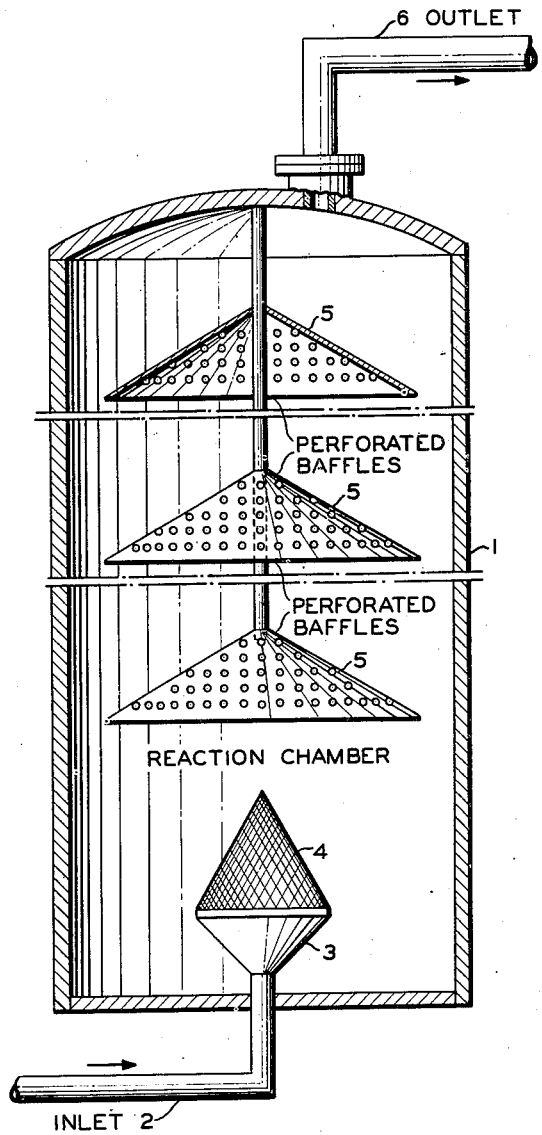

2,606,104

UNITED STATES PATENT OFFICE 2,606,104

CATALYST FLUIDIZATION

John Paul Hogan and Robert L. Banks, Bartlesville, Okla., assignors to Phillips Petroleum Company, a corporation of Delaware Application April 12, 1948, Serial No. 20,384

2 Claims. (Cl. 23—289)

This invention relates generally to catalytic systems for the production of hydrocarbons and more particularly to an apparatus for obtaining improved catalyst fluidization within the reaction chamber of such system.

This invention is particularly applicable to the catalytic synthesis of hydrocarbons from hydrogen and carbon monoxide in which the "fluidized bed" process is employed. In this type of process, feed gas comprising hydrogen and carbon monoxide is passed into the bottom of an elongated vertical reaction chamber, and flows upwardly through a mass of finely divided catalytic material maintained at an elevated reaction temperature. The velocity of the influent gas maintains the catalytic material in a fluidized and ebullient condition. The influent gas and the reaction products pass through the reaction chamber in opposition to the gravitational force acting upon the catalyst, and as a result, the catalyst assumes a condition of fluidity with the catalyst density greater in the lower portion of the bed than in the upper portion, the effluent gas being relatively catalyst-free.

In order that the "fluidized bed" operations can be carried out at maximum efficiency it is essential that conditions hindering inordinately high rates of conversion be remedied. If the influent gas is not evenly distributed on a horizontal plane within the reaction chamber, regions of stagnant catalyst and channelling of the gas flowing through the catalyst will result and cause a corresponding decrease in the rate of conversion. Poor gas distribution will also cause poor heat distribution with resultant overheating and increased carbonaceous deposits upon the catalyst.

An object of the invention is to provide apparatus for obtaining improved distribution and fluidization of the catalyst within the reaction zone. Another object is to provide an apparatus for avoiding undesired conditions within the reaction zone by encouraging a high degree of contact between the synthesis gas and the catalyst. A further object is to control the fluidization of the catalyst in the reaction zone by utilizing its relationship to the linear velocity of the synthesis gas. Additional objects will be apparent from the description that follows.

We have have found that improved distribution of the catalyst can be obtained by providing the reaction chamber with perforated baffles. These baffles are preferably metallic and in the shape of a cone the area of which is 40–60 per cent holes of ⅛ to ⅜ inch diameter, of about 90°–120° total angle, of diameter about ¾ to ⅞ that of the chamber and spaced concentrically at intervals of one to four diameters of the chamber, but, obviously, these specific limitations are preferred and not critical. The use of the perforated baffles permits the upsurging catalyst to pass through the perforations while the baffles tend to cause the downward falling catalyst to pass through the annular space between the baffles and the reaction chamber wall. The use of the baffles will improve the distribution of the catalyst within the reaction zone which in turn will decrease the problem of heat distribution throughout the reaction zone and which will increase the efficiency of the conversion process.

An iron catalyst is a preferred catalytic material for the synthesis of hydrocarbons from carbon monoxide and hydrogen by the fluidized method. It is prepared by treating ferric oxide with about ¼ per cent potassium carbonate, and, after fusing and grinding to 100/325 mesh, it is reduced with hydrogen. We have found that with the use of this type of catalyst, space velocities of 1200 to 5000 volumes of influent gas per volume of catalyst per hour may be utilized. Temperature ranges of 500–700° F. may be used at pressure ranges of 150–600 pounds per square inch. For efficient fluidization of an iron catalyst with a 100/325 mesh size, we have found that the linear velocity of influent gas should preferably be in the range of 0.6–2.0 feet per second. Lower velocities produce catalyst concentrations which are too high for efficient operation, and higher velocities tend to carry the catalyst out of the reactor.

The perforated type baffle is preferred in our invention to the solid type because the former improves the fluidization of the catalyst in the reactor very markedly over the latter. The solid type baffle tends to direct the upward flow of gases and suspended catalyst through the annular space between the baffle and the wall of the reaction chamber, causing the concentration of both gas and suspended catalyst to be greater near the reaction chamber walls than in the center of the reaction chamber. This invention will correct the difficulties encountered when using a solid baffle. The use of the perforated type baffle will improve the distribution of both the gas and the catalyst within the reaction zone, because the upward flowing gases and catalyst will be permitted to pass through the perforations. This will not only tend to equalize the distribution of gases and catalyst throughout the reaction zone but it will also prevent channelling within the reaction zone and it will prevent the passage of large bubbles of unconverted gases through the reaction zone. Also, as pointed out above, the flow of downward falling catalyst will be directed by the baffles through the annular space between the baffles and the reaction chamber walls, producing improved circulation of suspended catalyst and heat transfer within the reaction zone.

The description and diagrammatic drawing of our invention disclose merely our preferred method of using the perforated, conical baffles which is in the upright position, i. e. the apex of the cone is vertically directly above the geometric center of the base of the cone. It is apparent to anyone skilled in the art that numerous variations could be utilized without going beyond the scope of the invention. For example, variations in the shape and in combinations of shapes of the baffles are contemplated by the invention.

Further, our preferred description and drawing show the baffles as concentrically and axially positioned and spaced at equidistant intervals within the reaction chamber. These positions are not critical, and it is obvious to anyone skilled in the art that these positions may be varied widely in order to obtain improved catalyst fluidization and distribution under the specific reaction conditions.

The size of the perforations in the baffles is not critical, but the total area of the openings must be sufficient to encourage the movement of the gas and suspended catalyst up through the openings rather than around the baffles.

In a fluidized catalytic hydrocarbon conversion zone the catalyst fluidization is dependent upon the linear velocity of the influent reactant gases and it is within the scope of our invention that the fluidization should be controlled in accordance with the equation $$V = KR^n$$

where $V$ is the apparent linear velocity of the influent gas through the catalyst bed, $R$ is the ratio of fluidized bed depth to settled bed depth and $K$ and $n$ are constants for the particular system and units being used. This equation affords a practical and efficient means for controlling the catalyst fluidization in a conversion zone by the simple expedient of controlling the linear velocity of the influent gas in accordance with the equation.

The invention can be understood by referring to the accompanying drawing. The influent gas comprising hydrogen and carbon monoxide in a molal ratio of 2:1 enters the reactor 1 through inlet pipe 2, and then it passes through inlet cone 3 covered with wire screen 4 of a mesh size sufficiently small to prevent passage of the catalyst. The settled catalyst bed is contained around wire screen 4, and the influent gas after passage through this bed passes through the perforations in the conical baffles 5 carrying some particles of catalyst with it. Near the top of the reactor the catalyst separates from the gas, and in falling it strikes the solid portions of conical baffles 5 and it is thus forced to fall through the annular space at the outer section of the reactor. The effluent gas leaves the reactor at outlet 6, and it is ready for further processing, if necessary.

This invention is not confined to hydrocarbon synthesis, but it is generally applicable to processes in which a fluidized catalytic bed is used. In some processes it may become necessary to alter the design, construction or location of the baffles to obtain maximum efficiency in operation, but the essential and novel features of this invention will be retained.

We claim:

1. Apparatus for effecting a catalytic synthesis of hydrocarbons wherein a gaseous mixture comprising hydrogen and carbon monoxide in the approximate molar ratio of 2:1 is contacted at an elevated temperature and pressure with a finely divided reduced iron oxide catalyst suspended in said upward flowing gaseous mixture which comprises a vertically elongated reaction chamber, inlet means for the influent gaseous reactants near the bottom of said reaction chamber, outlet means for the reaction effluent near the top of said reaction chamber and perforated, cone-shaped, upward tapering, axially and concentrically placed baffles whose base diameters are not greater than ⅞ times the diameter of said reaction chamber and wherein the area of the perforations in each conical baffle is from 40 to 60 per cent of the total area of each baffle and wherein the perforations are from ⅛ to ⅜ inch in diameter and are distributed uniformly over the surface of the said baffles and said baffles are suspended within the chamber by a supporting member attached to and covering the apex of the said cone-shaped baffles.

2. Apparatus according to claim 1 wherein the perforated, cone-shaped baffles are axially and concentrically placed in the reaction chamber at equidistant intervals of one to four diameters of said chamber.

JOHN PAUL HOGAN.
ROBERT L. BANKS.

REFERENCES CITED

The following references are of record in the file of this patent:

UNITED STATES PATENTS

| Number | Name | Date |
|---|---|---|
| 1,932,655 | Erickson | Oct. 31, 1933 |
| 2,425,098 | Kassel | Aug. 5, 1947 |
| 2,492,349 | Beck et al. | Dec. 27, 1949 |

FOREIGN PATENTS

| Number | Country | Date |
|---|---|---|
| 541,734 | Great Britain | Dec. 9, 1941 |